July 9, 1935.  F. H. MÜLLER  2,007,282
METHOD OF PRODUCING A MULTICOLOR SCREEN FOR THE
PRODUCTION OF PHOTOGRAPHIC COLOR PICTURES
Filed June 19, 1931   2 Sheets-Sheet 1

July 9, 1935. F. H. MÜLLER 2,007,282
METHOD OF PRODUCING A MULTICOLOR SCREEN FOR THE
PRODUCTION OF PHOTOGRAPHIC COLOR PICTURES
Filed June 19, 1931    2 Sheets-Sheet 2
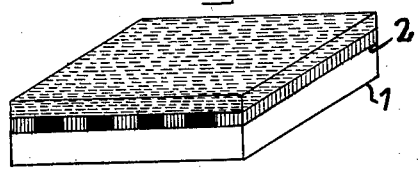
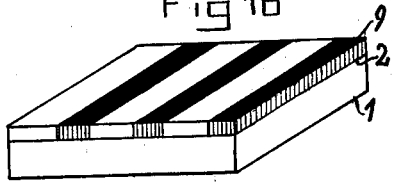
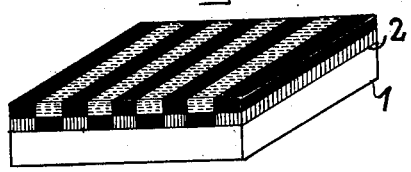
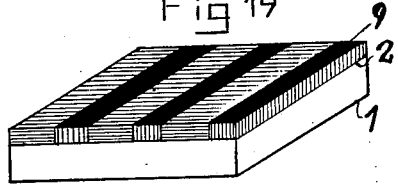
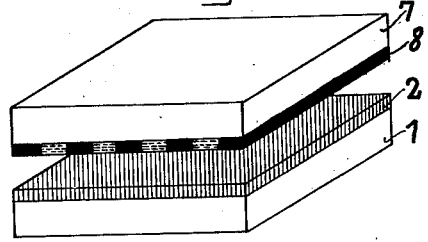
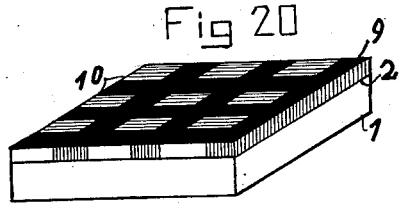
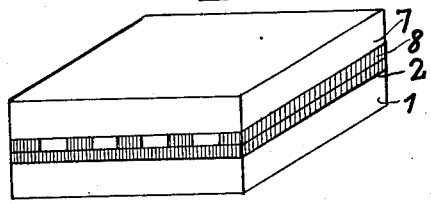
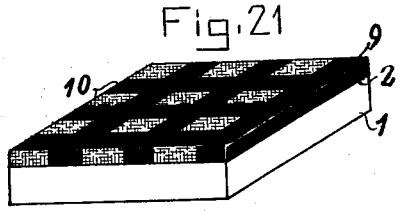
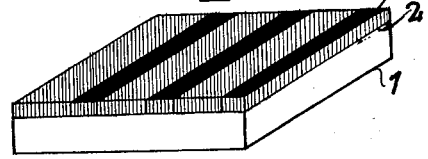
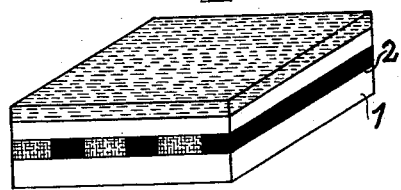

Patented July 9, 1935

2,007,282

UNITED STATES PATENT OFFICE 2,007,282

METHOD OF PRODUCING A MULTICOLOR SCREEN FOR THE PRODUCTION OF PHOTOGRAPHIC COLOR PICTURES

Franz Hubert Müller, Bielefeld, Germany, assignor to Dürkopp-Werke A.-G., Bielefeld, Germany Application June 19, 1931, Serial No. 545,492
In Germany June 1, 1931

4 Claims. (Cl. 95—81.5)

Screens for the production of colored photographic pictures are know which are called either point screens or line screens. In the case of the point screens the red, green and blue colors are applied to the plate or film in finely granulated form. In the case of line screens the colors are applied successively in several layers. The present invention relates to the production of a line screen and consists substantially in that a multicolored screen of absolute regularity and any desired screen fineness is produced in only one layer in that the different screen colors are applied by partly hardening, printing the line screen, washing out the hardened lines, coloring the non-hardened portion with another color.

Several embodiments of the invention are illustrated by way of example in the accompanying drawings, in which:—

Figs. 10 to 14 show the stages of a third method for producing a two-color screen.

Figs. 15 and 16 show the stages of still a further method.

Figs. 17 to 22 show the different stages for producing a three-color screen in only one layer.

Figure 1:
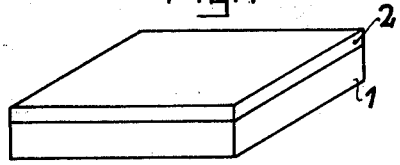
Figs. 1 to 6 show the different stages of one method of producing a two-color screen in only one layer.
Figure 2:
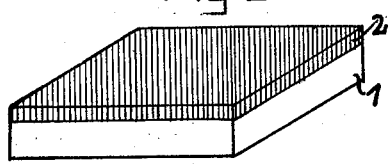
Figure 3:
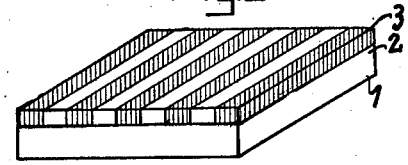
Figure 4:
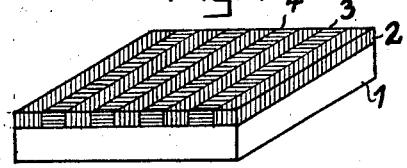
Figure 5:
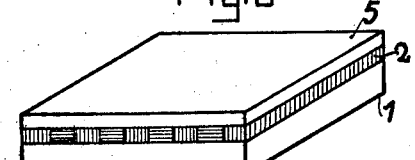
Figure 6:
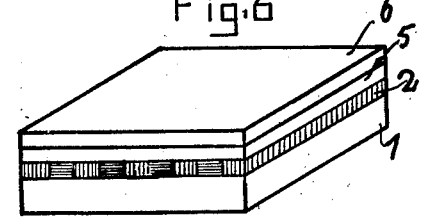

According to Figs. 1 to 6 the film or plate 1 is coated with gelatine 2, which, in the case of a two-color screen is colored, for example red (Fig. 2) which can be subsequently washed out. The gelatine is then sensitized with potassium or ammonium bichromate solution and dried. After the drying a vertical screen 3 (Fig. 3) is printed by exposure on the layer thus prepared. Owing to this exposure the gelatine hardens at the portion upon which the light impinges. After the printing the plate is washed until the color is entirely washed out from the non-hardened portions. The portions from which the red has been removed are colored with another color, for example ultramarine blue, which must be capable of adhering on the non-hardened portions. The film or plate is then placed in a bath of potassium permanganate. This is effected for the purpose of removing by oxidation the second color which may have settled to the portions of the gelatine colored and hardened. The whole layer however becomes slightly brown by the potassium permanganate bath and this brown coloring is removed by a suitable bath of potassium metabisulphite, the colors are thus rendered purer and brighter by this bath. The film is then washed, dried, coated, with a neutral varnish 5 (Fig. 5) and a very sensitive panchromatic emulsion 6 (Fig. 6) poured thereover.

Figure 7:
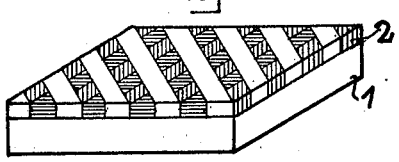
Fig. 7 shows a screen interspersed with pure whites.

Fig. 7 is the graphic illustration of a multicolored screen interspersed by pure whites.

Figure 8:
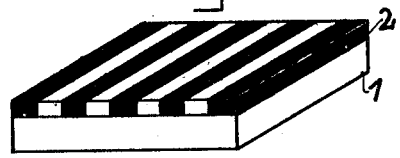
Figs. 8 and 9 show the stages of a modified method for producing a two-color screen.
Figure 9:
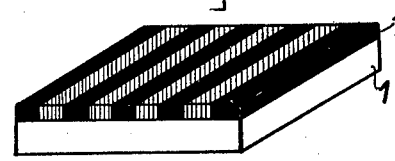
Figure 10:
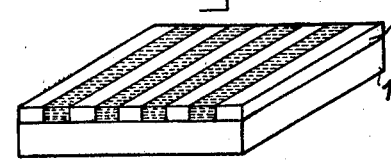
Figure 11:
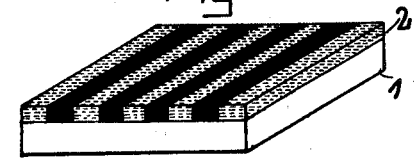
Figure 12:
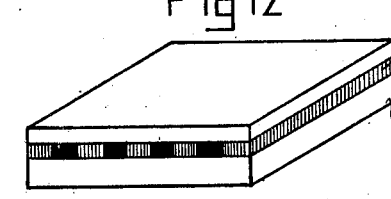

According to Figs. 8 and 9 for producing a two-color screen the film or plate is coated with a light sensitive emulsion containing silver, on which the screen is printed, developed, fixed and washed; it is then steeped in a red color, and the silver grain converted into silver bromide, after which the grey lines are washed out in the fixing bath. The non-hardened color is then washed out, colored blue, the overlapping color is removed by oxidation, after which it is varnished and coated with emulsion.

According to Figs. 10 to 14 the film or plate is coated with a silver bromide or chloride emulsion, on which the screen is printed; the black silver screen is then converted into a ferrocyanide copper screen and colored red, and is then washed. A second layer of silver bromide or silver chloride emulsion is then applied, exposed from the rear side of the plate or film, and the black screen converted into a ferro-cyanide copper screen, after which a blue color is applied; the plate being then washed, varnished and coated with pan-chromatic emulsions.

As shown in Figures 15 and 16, the reference character 8 designates an emulsion containing a silver image, which was obtained by silver bromide sensitization, exposure, development and fixing, and is carried by a paper support 7. The layer 2 on the support 1 is colored red and treated with the usual solution for "ozobrome" work. The layers 8 and 2 are pressed into contact while wet and later separated. The red color is washed out of the unhardened gelatine in layer 2 and this is redyed green, the overlapping color removed by oxidation, the layer varnished and coated with a highly sensitive panchromatic emulsion.

The color screens can evidently be produced in a different sequence of operations, in that the screen is first painted on the prepared plate, then colored with a suitable color, after which the unhardened portions are dissolved or washed out and the second color applied.

Figs. 17 to 22 show the production of a three-color screen in only one layer. The glass plate covered with gelatine is colored red, sensitized by means of a bichromate and dried. After the drying a vertical screen 9 is printed on the plate, the dark lines of the screen being of half the width of the light lines. After the printing the plate is washed until the color disappears from the non-hardened portions (Fig. 18). These portions are then colored with ultramarine blue, whereupon the plate is again sensitized by means of a bichromate and dried. A horizontal screen in which the light and dark lines are uniformly wide is then printed on the plate. The unhardened blue portions are then weakened by washing so that, when yellow is applied, these portions are colored green, or these portions are washed away entirely and colored green (Fig. 21). After which, exactly as in the production of the two-color screen, the plate is placed in potassium permanganate and potassium metabisulphite baths, then washed, dried, varnished and coated with a panchromatic layer (Fig. 22).

For producing a screen for positive paper pictures, in which graphic illustration according to Fig. 7 can be employed, pure whites are printed besides the different colors in order to brighten the paper picture because in the additive paper pictures the three additive colors do not mix to form a pure white. In order to correspondingly brighten the layer at the light portions the light positive screen is intersected by pure whites either by hardening the gelatine under a suitable line screen before the coloring, or by applying a protecting screen with some water repelling substance.

The colors referred to herein as being bleached by potassium permanganate are organic colors which bleach more or less when so treated. The reaction is particularly strong and rapid in the case of colors employed in colored photography, for example those described in the publication, Pina Handbuch, published by Farbwerke vorm. Meister Lucius & Bruning, Hochst am Main.

In a cinematographic film produced according to the method above described it is possible to convert the negative directly into a positive. However, if negative copies are to be produced, a film may be employed prepared exactly like the film used for taking the pictures, but coated with only a slightly sensitive panchromatic emulsion.

I claim:—

1. A method for producing a multi-color screen for photographic pictures, consisting in sensitizing a colloid layer with silver bromide, in copying pure white lines in said layer, in applying in this same layer different screen colors by silver bromide sensitizing for coloring the layer, partly hardening the same and copying a line screen therein, then washing to remove the unhardened lines and subsequently coloring the washed unhardened portions with another color.

2. A method for producing a multi-color screen for photographic pictures, consisting in sensitizing a layer of gelatine with silver bromide, in copying pure white lines on said layer, in applying the layer of gelatine to a film, in coloring the applied layer with one color, sensitizing by silver bromide and drying the same, in copying the screen negative thereof, in washing out the first color from the unhardened portions, in applying a second color to the layer, in dipping the film first in permanganate of potassium and then in potassium metabisulphite, in washing, drying and coating with varnish, and in applying a panchromatic highly sensitive emulsion to the layer.

3. A method for producing a multi-color screen for photographic pictures, consisting in sensitizing a layer of gelatine with silver bromide, in copying pure whites in said layer, in coloring said layer with one color, in producing a screen on silver bromide paper, in applying said screen to the layer according to the ozobrom process, in removing the silver bromide paper, in washing out the unhardened color, in applying another color, in removing the covering color, in varnishing the layer and in pouring thereover a highly sensitive panchromatic emulsion.

4. A method for producing a three-color screen for photographic pictures, consisting in coating a film with a plastic layer, in copying pure whites on this layer, in coloring this layer red, sensitizing the same with silver bromide, copying thereon a screen having one part light and two parts dark, washing out the unhardened red color, applying blue to the unhardened washed out portion, again sensitizing the film, copying thereon at right angles to the first screen a second line screen having transparent and opaque lines of equal thicknesses, in washing out the unhardened blue portions, in coloring yellow to produce green, in removing the covering color in applying a coat of varnish, and pouring a highly sensitive panchromatic emulsion thereover.

FRANZ HUBERT MÜLLER.